United States Patent Office 3,406,155
Patented Oct. 15, 1968

3,406,155
CATIONIC VINYL LACTAM-ACRYLAMIDE COPOLYMERS
Julian L. Azorlosa, Easton, and Earl P. Williams, Pen Argyl, Pa., assignors to GAF Corporation, a corporation of Delaware
No Drawing. Filed May 18, 1965, Ser. No. 456,826
15 Claims. (Cl. 260—80.3)

ABSTRACT OF THE DISCLOSURE

A composition of matter which is useful as a flocculant for aqueous dispersions containing suspended inorganic solid particles and as filler retention aid in paper making, consisting essentially of cationic vinyl lactam-acrylamide copolymer having the following recurring units:

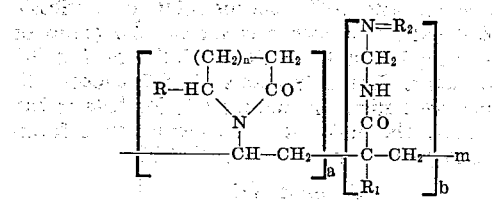

wherein R is selected from the group consisting of hydrogen, methyl and ethyl, $R_1$ is selected from the group consisting of hydrogen and methyl, $R_2$ is selected from the group consisting of dimethyl, diethyl, dihydroxyethyl and morpholino, $n$ is a positive integer of from 1 to 3, $a$ is selected from the recurring units ranging from 50 to 95% by weight of the lactam moiety in said copolymer, $b$ is selected from the recurring units ranging from 5 to 50% by weight of the acrylamide moiety in said copolymer, and $m$ represents the relative viscosity of from 5 to 30 of said copolymer as measured using 1 gram of copolymer in solution in 100 ml. of water at 25° C.

---

The present invention relates to a new composition of matter comprising cationic vinyl lactam-acrylamide copolymers useful as flocculants and filler retention aids in paper making.

It is the principal object of the present invention to provide a new and useful class of cationic vinyl lactam-acrylamide copolymers.

Another object is to provide a process for making a filled paper composition while employing said copolymers.

A still further object is to provide a process for flocculating suspended inorganic solids.

Other objects and advantages will become manifest from the following description.

We have discovered that in the attainment of the foregoing objects, it is necessary to first prepare the cationic vinyl lactam acrylamide copolymer. This is accomplished by copolymerizing in a polymerization apparatus from 50 to 95% by weight of an N-vinyl lactam monomer with from 5 to 50% by weight of acrylamide or methacrylamide in aqueous solution with a free radical catalyst such as, for example, azobisisobutyronitrile, lauroyl peroxide, benzoyl peroxide, t-butylperbenzoate, hydrogen peroxide plus ammonia, etc. in the range of 0.18%–0.25%, preferably 0.20% based on the weight of total monomers at a pH between 7 and 8, to minimize the hydrolysis of the comonomers at a temperature of 60–70° C., preferably at about 65° C. for a period of time ranging from 2 to 4 hours, followed by heating the reaction mixture in a steam bath for 1 to 3 hours. The resulting viscous, colorless solution (base copolymer) has a relative viscosity (1% weight by volume in water at 25° C.) of from about 5 to about 38. The relative viscosity will depend on reaction temperature and monomer concentration.

The N-vinyl lactams which are copolymerized with either acrylamide or methacrylamide are characterized by the following formula:

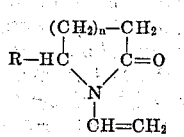

wherein R is either hydrogen, methyl or ethyl group and $n$ represents an integer of from 1 to 3.

As specific illustrations of such N-vinyl lactams, the following may be mentioned:

N-vinyl-2-pyrrolidone
N-vinyl-5-methyl-2-pyrrolidone
N-vinyl-5-ethyl-2-pyrrolidone
N-vinyl-2-piperidone
N-vinyl-6-methyl-2-piperidone
N-vinyl-6-ethyl-2-piperidone
N-vinyl-2-caprolactam
N-vinyl-7-methyl-2-caprolactam
N-vinyl-7-ethyl-2-caprolactam Prior to copolymerization, the free radical catalyst is dissolved in the N-vinyl lactam and the resulting solution added to a solution of the acrylamide or methacrylamide in water, preferably distilled water. The concentration of acrylamide or methacrylamide in the aqueous solution may range from 5 to 50% by weight. The pH of the solution is then adjusted to a pH between 7 and 8, preferably at about 8 with aqueous dibasic sodium phosphate, dibasic potassium phosphate, sodium ammonium phosphate, and the like. The total volume of the reactants is made up to about 150 parts by volume with water, preferably distilled water. The resulting solution is then placed in any conventional sealed polymerization apparatus such as, for example, a Pyrex polymerization tube which is cooled to 0° C., evacuated and the neck sealed off. The tube is placed in a 65° C. constant temperature bath for a period of time ranging from 2 to 4 hours and then into a steam bath for 1 to 3 hours. The resulting viscous colorless solution has a relative viscosity ranging from about 5 to 30. It is then diluted to a concentration of about 5% weight by volume, with distilled water. A 50 part by weight aliquot of the 5% solution of the copolymer is then reacted with formaldehyde and a dialkylamine at a pH of about 9–11. This reaction can be effectuated in two steps by (a) first reacting with formaldehyde to form methylol acrylamide or methylol methacrylamide groups followed by reacting with the dialkylamine, dialkanolamine, or morpholine, (b) adding the formaldehyde and dialkylamine, or dialkanolamine or morpholine, sequentially, or (c) premixing the formaldehyde and dialkylamine, dialkanolamine or morpholine and then adding the mixture. The mole ratio of the said amine or morpholine formaldehyde/acrylamide or methacrylamide moiety can be varied over a wide range, provided that the said amine or morpholine formaldehyde ratio is >1 and the formaldehyde/acrylamide or methacrylamide mole ratio is not substantially greater than 1. The preferred molar ratio of said amine or morpholine to formaldehyde is 1:1 to 1.5:1 whereby the acrylamide or methacrylamide moiety in the copolymer will contain on the nitrogen atom from 2% to 40% by weight of the cationic group $—CH_2—N=R_2$ wherein $R_2$ is either dimethyl, diethyl, dihydroxyethyl or morpholino. The active ingredient is a cationic polymeric N-vinyl lactam having the following formula:

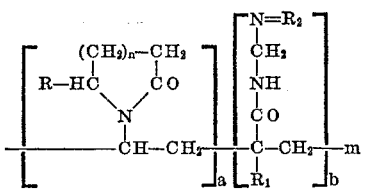

wherein R and $n$ have the same values as above, $R_1$ is either hydrogen or methyl, $R_2$ is either dimethyl, diethyl, dihydroxyethyl or morpholino; $a$ represents from 50 to 95% by weight of the lactam moiety and $b$ represents from 5 to 50% by weight of the acrylamide or methacrylamide moiety in the copolymer, and $m$ represents the approximate molecular weight characterized by a relative viscosity of about 5 to about 38 as determined from a 1% (weight by volume) aqueous solution of the said copolymer at 25° C.

The following examples will show how the cationic N-vinyl lactam acrylamide copolymer is prepared. For the sake of brevity it is to be understood that the term "acrylamide" includes both acrylamide, per se, and methacrylamide.

Example I

A 60 weight percent of N-vinyl-2-pyrrolidone and 40 weight percent of acrylamide copolymer was prepared by dissolving 0.024 gram of azobisisobutyronitrile in 7.2 grams of redistilled commercial N-vinyl-2-pyrrolidone. To the solution was then added a solution of 4.8 grams of acrylamide in 100 ml. of distilled water. The pH of the solution was adjusted to 8 with 35 drops of 10 percent aqueous solution of dibasic sodium phosphate. The total volume was made up to 150 ml. with distilled water. The resulting solution was placed in a Pyrex polymerization tube, which was cooled to 0° C., evacuated, and the neck sealed off. The tube was placed in a 65° C. constant temperature bath for three hours, then in a steam bath for two hours. The resulting viscous, colorless solution was diluted to 5%, weight by volume with distilled water. The pH was 7.8. A 1% weight by volume aqueous solution has a relative viscosity of 21.6 at 25° C.

A 50 gram aliquot of the foregoing 5% solution was weighed into a four-ounce, wide-mouth, screw-cap bottle. To this was added 1.10 grams of 38% aqueous formaldehyde (containing 12% methanol) followed by 4.14 grams of 22.8 percent aqueous dimethylamine. The system was stirred thoroughly by means of a glass rod, capped and placed in a 70° C. oil bath for two hours. The pH was 11.0. A 1% weight by volume aqueous solution has a relative viscosity of 30.7 at 25° C.

Example II

Example I was repeated with the exception that only 0.55 gram of 38% aqueous formaldehyde and 2.07 grams of the 22.8% aqueous dimethylamine were employed. The product has a pH of 11.0 and a relative viscosity of 37.9 at 1% w./v. at 25° C.

Example III

Example I was repeated with the exception that 7.2 grams of N-vinyl-2-pyrrolidine were replaced by 7.2 grams of N-vinyl-2-piperidone. The product has a pH of 11.0 and a relative viscosity of 34.9 at 1% w./v. at 25° C.

Example IV

Example I was repeated with the exception that 7.2 grams of N-vinyl-2-pyrrolidine were replaced by 7.2 grams of N-vinyl-2-caprolactam. The product has a pH of 11.0 and a relative viscosity of 36.5 at 1% w./v. at 25° C.

Example V

Example I was again repeated with the exception that 7.2 grams of N-vinyl-2-pyrrolidone were replaced by 7.2 grams of N-vinyl-5-methyl-2-pyrrolidone and the 4.8 grams of acrylamide were replaced by 4.8 grams of methacrylamide. The product has a pH of 10.9 and a relative viscosity of 31.0 at 1% w./v. at 25° C.

Example VI

Three separate 80 weight percent of N-vinyl-2-pyrrolidone and 20 weight percent of acrylamide copolymers of different monomer weight were prepared in aqueous solution by the procedure described in Example I, while employing isopropanol as a chain transfer agent.

| Charged: | | | |
|---|---|---|---|
| Azobisisobutyronitrile (g.) | 0.030 | 0.030 | 0.030 |
| N-vinyl-2-pyrrolidone (g.) | 12.00 | 12.00 | 12.00 |
| Acrylamide (g.) | 3.00 | 3.00 | 3.00 |
| Isopropanol (g.) | None | 0.45 | 1.50 |
| Distilled H₂O to total volume of (ml.) | 150 | 150 | 150 |
| Relative viscosity: 1% (w./v.) aqueous solution of copolymer | 9.8 | 8.4 | 6.5 |

After diluting to 5% polymer solids, 100 gram aliquots of each of the above solutions was adjusted to pH=10.6 ± 0.1 with 10% aqueous solution of tribasic sodium phosphate. Into each was stirred 1.20 grams of 37% formaldehyde and the resulting solution held at 50° C. for 1½ hours. Then 2.78 grams of 25% aqueous dimethylamine were stirred in and the solution held at 70° C. for ¾-hour. The mole ratio of dimethylamine/formaldehyde/acrylamide unit was 1.10/1.05/1.00.

Example VII

A 60 weight percent of N-vinyl-2-pyrrolidone and 40 weight percent of acrylamide copolymer was prepared in the same manner as described in Example I. In this case, a 5% aqueous solution of the base coploymer (50 grams) was adjusted to a pH of 10.6 with 10% aqueous tribasic sodium phosphate. Then 0.8 gram of 38% aqueous formaldehyde and 1.21 grams of morpholine were stirred in. The mole ratio of morpholine/formaldehyde/acrylamide unit was 1.00/0.72/1.00. The solution was held at 70° C. for four hours. A portion of the solution was dried on a steam-heated stainless plate. The resulting brittle film was water soluble.

The cationic copolymers, as above prepared, are ideally adapted as flocculating agents in the clarification of water for industrial use, e.g., silty river water, mine underground water, boiler water, raw water, drilling water, and in the settling of ore and coal fines. The dosage levels in such use may range from 0.001 to 10 lbs. of flocculating agent per ton of mineral solids. In brief, the process of flocculation consists of adding the cationic N-vinyl lactam-acrylamide copolymer to a given suspension with sufficient agitation to insure uniform distribution. When the system is quiescent, the flocculated aggregates will settle out. In general, there is an optimum range for the flocculant/suspended fines ratio. At too high a concentration, the flocculant would act as a suspending agent.

The cationic copolymers are very effective in varied operations in the pulp and paper industry. The addition of 1-ounce to 1 lb. (solid basis) per ton of paper pulp (cellulosic wood) fiber (dry basis) in the form of about 0.05% aqueous solution at the head box or fan pumps provides significant savings since less filler is lost in the "white water." This is particularly important when an expensive pigment like titanium dioxide is used. They are also effective in "white water" effluent wastes from bond mills and similar operations. Such wastes are readily clarified at loadings of 0.1 to 1.5 parts per million of the cationic copolymer.

Example VIII

Example I was repeated with the exception that the 60% N-vinyl-2-pyrrolidone 40% acrylamide copolymer was reacted with 0.39 mole of dimethylamine and 0.36 mole of formaldehyde per mole unit of acrylamide. A 1% aqueous solution of the cationic copolymer has a Brookfield viscosity of 80 cps. at a pH of 7.2 and 25° C.

To determine the effectiveness of the cationic copolymers of Examples I to VIII as flocculants, ten separate suspensions of No. 19 silica (25 grams) were made by agitating with 300 ml. of distilled water. A 200 ml. aliquot of a 0.0025% aqueous solution of cationic copolymer of each of Examples I to VIII was added to each separate silica dispersion. The resulting mixtures are agitated for 2 minutes and poured into a 500 ml. graduated cylinder. The time required for the dispersion level to drop to the 450 ml. mark is measured in seconds. The level dropped from the 450 ml. to the 150 ml. mark is also measured in seconds. At the latter mark, the supernatant liquid should be clear within 120 to 300 seconds. In these tests, 1 part of cationic copolymer was used per 5000 parts silica. The results obtained are as follows:

TABLE I

| Cationic copolymer | Drop from 500 to 450 ml. (seconds) | Drop from 450 to 150 ml. (seconds) |
| --- | --- | --- |
| Control (no cationic copolymer) | No apparent clearing within 900 seconds | |
| Example: | | |
| 1 | 11 | 41 |
| 2 | 8 | 46 |
| 3 | 8 | 42 |
| 4 | 10 | 44 |
| 5 | 12 | 46 |
| 6a | 8 | 40 |
| 6b | 10 | 44 |
| 6c | 15 | 50 |
| 7 | 12 | 49 |
| 8 | 5 | 10 |

In determining the effectiveness of the cationic copolymers as paper filler retention aids (Single Pass Retention Test), standard air floated clay (Georgia Kaolin) was added dry to bleached sulphite pulp (27° Schopper Riegler freeness) at 3% consistency and mixed 5 minutes after which 2% rosin size and 2½% of alum were added. Freeness is a paper industry term denoting rate at which water drains away from a pulp in formation of paper sheet. Mixing was continued for 25 minutes and the pulp slurry diluted to 0.3% consistency. Nine separate samples of the latter were prepared, one of which was employed as a control. To the remaining 8, 0.0475% aqueous solution of the cationic copolymers of Examples I to VIII were separately added and hand stirred for one minute. The control was also hand stirred. The amount of retention aid added corresponded to eight ounces of 100% polymer per ton of fiber on the dry basis. Hand sheets were formed, pressed and dried in a steam-heated paper dryer in the conventional manner. Filler retention was determined by ashing the hand sheets. The results obtained are shown in Table II.

TABLE II

| Cationic copolymer | 10% clay added on weight of fiber | | 20% clay added on weight of fiber | |
| --- | --- | --- | --- | --- |
| | Percent ash | Percent gain over control | Percent ash | Percent gain over control |
| Control (no cationic copolymer) | 4.39 | | 7.08 | |
| Example: | | | | |
| 1 | 6.56 | 49.4 | 12.48 | 76.3 |
| 2 | 6.74 | 54.6 | 11.99 | 69.4 |
| 3 | 6.47 | 47.4 | 11.88 | 67.7 |
| 4 | 5.29 | 43.0 | 11.0 | 59.2 |
| 5 | 6.91 | 39.3 | 12.05 | 46.7 |
| 6a | 5.9 | 59.6 | 12.1 | 75.4 |
| 6b | 5.5 | 48.7 | 11.8 | 71.0 |
| 6c | 5.3 | 43.3 | 11.0 | 59.3 |
| 7 | 7.50 | 53.1 | 13.36 | 64.00 |
| 8 | 6.97 | 42.2 | 11.61 | 50.00 |

Example IX

The cationic copolymer of Example VIII was tested to determine its effectiveness in the flocculation of solids in preparing mill (white water). In this test a synthetic paper mill white water (water removed during sheet formation) by dispersing 90 grams of clay and 36 grams of kraft fiber (dry weight) in 36 liters of water was prepared. To it was added 2% of rosin size and 3% alum on weight of fiber. The final pH was adjusted to 4.5 with sulfuric acid.

475 ml. aliquots of white water were measured into a whipped cream dispenser; aliquots of water solutions of the flocculants were added and the dispenser was charged with a $CO_2$ cartridge. The dispenser was then discharged into a 1000 ml. burette and time to initial visible flocculation was taken as the first end point and time to initial visible clarification as the second end point. Flocculant concentration is stated on solids basis. The results obtained are as follows:

| Flocculant | Flocculant concentration in white water (p.p.m.) | Time to initial visible flocculation (secs.) | Time to initial visible clarification (secs.) |
| --- | --- | --- | --- |
| Control | None | 12 | 40 |
| Example VIII | 1 | 1 | 5 |
| | 5 | 1 | 2 |

Example IX was repeated with the cationic copolymers of Examples I to VII. Substantially the same results were obtained.

Example X

The following was charged to a three liter flask:
0.25 g. azobisisobutyronitrile dissolved in 100 grams of distilled N-vinyl-2-pyrrolidone. To this was added a solution of 25 grams acrylamide in 1125 grams of distilled water. The pH of the solution was adjusted to pH 8.0 with 3.7 ml. 10% aqueous solution of dibasic sodium phosphate.

The stirred solution was evacuated and purged with a nitrogen atmosphere. The contents of the flask were heated at 65° C. for two hours and then raised to 97° C. and heated at that temperature for an additional hour. When diluted to 1% (weight of volume aqueous) the relative viscosity=8.44 at pH 7.2.

A 100 gram aliquot of the foregoing 8% solution was weighed into a six ounce wide mouth screen cap bottle. To this was added 1.3 grams of 36.77 aqueous formaldehyde followed by 4.1 grams 24% aqueous dimethylamine. The system was stirred thoroughly by means of a glass rod, capped and placed in a 70° C. oil bath for 2 hours. The pH was 11.1. A 1% weight by volume aqueous solution has a relative viscosity of 12.3 at 25° C.

Example XI 0.024 gram azobisisobutyronitrile was dissolved in 11.40 grams redistilled commercial N-vinyl-2-pyrrolidone. To the solution was then added a solution of 0.60 gram acrylamide in 100 ml. distilled water. The pH of the solution was adjusted to 7.6 with 2 drops of 10% aqueous solution of dibasic sodium phosphate. The total weight was made up to 120 grams with distilled water. The resulting solution was placed in a pyrex polymerization tube, which was cooled to 0° C., evacuated and the neck sealed off. The tube was placed in a 60° C. constant temperature bath for six hours, then in a steam bath for two hours. The resulting viscous, colorless solution when diluted to 1% (weight by volume aqueous) had a relative viscosity of 5.06 at pH 7.1.

A 100 gram aliquot of the foregoing 10% solution was weighed into a six ounce wide mouth screen cap bottle. The pH of the solution was adjusted to 10.4 with 2.3 ml. 10% $Na_3PO_4 \cdot 12 H_2O$. To this was added 0.6 gram of 37% aqueous formaldehyde. The system was stirred thoroughly by means of a glass rod, capped and placed in a 50° C. oil bath for 1½ hours. 1.38 g. 25% aqueous dimethylamine was then added and the temperature raised to 70° C. for ¾ hour. The first pH was 10.4. A 1% weight by volume aqueous solution has a relative viscosity of 6.1 at 25° C.

Example XII

Example II was repeated with the exception that 2.07 grams of the 22.8% aqueous dimethylamine were replaced by 0.76 gram diethylamine. The product had a relative viscosity of 14.6 at 25° C. for 1% w./v. at pH 10.5.

Example XIII

Example II was again repeated with the exception that 2.07 grams of the 22.8% aqueous dimethylamine were replaced by 1.1 grams diethanolamine. The product had a relative viscosity of 20.5 for 1% w./v. at 25° C. at pH 10.4.

When Example IX was repeated with the cationic copolymers of Examples X to XIII inclusive, substantially the same results were obtained.

The cationic vinyl lactam-acrylamide copolymers of the foregoing formula are ideally suited as flocculants for aqueous dispersions containing suspended inorganic solid particles such as are found in fresh water streams, silty river water, and for the settling of ore fines in the range of 0.001 to 10 lbs. per ton of mineral solids at a pH of from 4 to 11. They are especially adaptable for treating waters prior to use in boilers for generating steam.

The cationic vinyl lactam-acrylamide copolymers may be employed either dry or in aqueous solution.

We claim:

1. A cationic vinyl lactam-acrylamide copolymer consisting essentially of the following recurring units

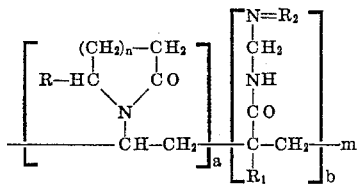

wherein R is selected from the group consisting of hydrogen, methyl and ethyl, $R_1$ is selected from the group consisting of hydrogen and methyl, $R_2$ is selected from the group consisting of dimethyl, diethyl, dihydroxyethyl and morpholino, $n$ is a positive integer of from 1 to 3, $a$ is selected from the recurring units ranging from 50 to 95% by weight of the lactam moiety in said copolymer, $b$ is selected from the recurring units ranging from 5 to 50% by weight of the acrylamide moiety in said copolymer, and $m$ represents the relative viscosity of from 5 to 30 of said copolymer as measured using 1 gram of copolymer in solution in 100 ml. of water at 25° C.

2. A cationic vinyl lactam-acrylamide copolymer according to claim 1 wherein the lactam moiety $a$ of said copolymer is derived from N-vinyl-2-pyrrolidone.

3. A cationic vinyl lactam-acrylamide copolymer according to claim 1 wherein the lactam moiety $a$ of said copolymer is derived from N-vinyl-2-piperidone.

4. A cationic vinyl lactam-acrylamide copolymer according to claim 1 wherein the lactam moiety $a$ of said copolymer is derived from N-vinyl-2-caprolactam.

5. A cationic vinyl lactam-acrylamide copolymer according to claim 1 wherein the lactam moiety $a$ of said copolymer is derived from N-vinyl-5-methyl-2-pyrrolidone.

6. The process of flocculating mineral solids from aqueous dispersions which comprises adding to said dispersions from 0.001 to 10 lbs. per ton of mineral solids present in said dispersions a cationic vinyl lactam-acrylamide copolymer consisting essentially of the following recurring units

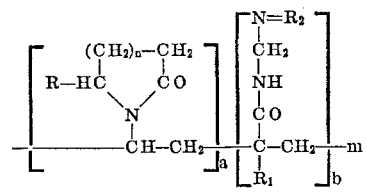

wherein R is selected from the group consisting of hydrogen, methyl and ethyl, $R_1$ is selected from the group consisting of hydrogen and methyl, $R_2$ is selected from the group consisting of dimethyl, diethyl, dihydroxyethyl and morpholino, $n$ is a positive integer of from 1 to 3, $a$ is selected from the recurring units ranging from 50 to 95% by weight of the lactam moiety in said copolymer, $b$ is selected from the recurring units ranging from 5 to 50% by weight of the acrylamide moiety in said copolymer, and $m$ represents the relative viscosity of from 5 to 30 of said copolymer as measured using 1 gram of copolymer in solution in 100 ml. of water at 25° C.

7. The process according to claim 6 wherein $R_2$ is dimethyl.

8. The process according to claim 6 wherein $R_2$ is diethyl.

9. The process according to claim 6 wherein $R_2$ is dihydroxyethyl.

10. The process according to claim 6 wherein $R_2$ is morpholino.

11. The process of preparing filled paper which comprises adding from 1/16 lb. to 1 lb. of cationic vinyl lactam-acrylamide copolymer per ton of paper pulp in aqueous suspension containing a water-insoluble inorganic filler prior to sheet formation, said copolymer consisting essentially of the following recurring units

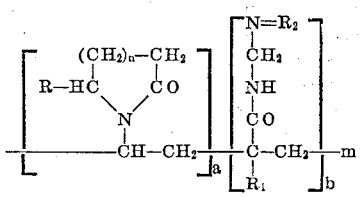

wherein R is selected from the group consisting of hydrogen, methyl and ethyl, $R_1$ is selected from the group consisting of hydrogen and methyl, $R_2$ is selected from the group consisting of dimethyl, diethyl, dihydroxyethyl and morpholino, $n$ is a positive integer of from 1 to 3, $a$ is selected from the recurring units ranging from 50 to 95% by weight of the lactam moiety in said copolymer, $b$ is selected from the recurring units ranging from 5 to 50% by weight of the acrylamide moiety in said copolymer, and $m$ represents the relative viscosity of from 5 to 30 of said copolymer as measured using 1 gram of copolymer in solution in 100 ml. of water at 25° C.

12. The process according to claim 11 wherein the lactam moiety $a$ of said copolymer is derived from N-vinyl-2-pyrrolidone.

13. The process according to claim 11 wherein the lactam moiety $a$ of said copolymer is derived from N-vinyl-2-piperidone.

14. The process according to claim 11 wherein the lactam moiety $a$ of said copolymer is derived from N-vinyl-2-caprolactam.

15. The process according to claim 11 wherein the lactam moiety $a$ of said copolymer is derived from N-vinyl-5-methyl-2-pyrrolidone.

References Cited

UNITED STATES PATENTS

| | | | |
|---|---|---|---|
| 2,205,355 | 6/1940 | Grimm et al. | 149—6 |
| 2,808,383 | 4/1955 | Firentsher et al. | 260—294 |
| 3,235,490 | 2/1966 | Goren | 210—52 |

JOSEPH L. SCHOFER, *Primary Examiner.*

S. M. LEVIN, *Assistant Examiner.*